United States Patent [19]
Kämpf et al.

[11] Patent Number: 5,341,675
[45] Date of Patent: Aug. 30, 1994

[54] ASSEMBLY FOR IDENTIFYING THE DIRECTION OF POWER IN THE CASE OF TORQUE TRANSMISSION

[76] Inventors: Klaus Kämpf, Schlesierweg 4, D-5204 Lohmar 1; Hans-Jürgen Langen, St. Magdalenenstrasse 28, D-5020 Frechen 4; Friedrich Herberg, Elly-Heuss-Knapp-Weg 18, D-6300 Giessen, all of Fed. Rep. of Germany

[21] Appl. No.: 963,058

[22] Filed: Oct. 19, 1992

[30] Foreign Application Priority Data

Oct. 19, 1991 [DE] Fed. Rep. of Germany ....... 4134659

[51] Int. Cl.$^5$ .................. G01M 19/00; G01L 3/06
[52] U.S. Cl. ................... 73/118.1; 73/862.08; 73/862.191; 340/441
[58] Field of Search .......... 73/118.1, 862.08, 862.191, 73/862.333, 862.191; 340/441, 453, 467

[56] References Cited

U.S. PATENT DOCUMENTS 5,014,560 5/1991 Hutchinson et al. ............ 73/862.33

FOREIGN PATENT DOCUMENTS

| 0194930 | 9/1986 | European Pat. Off. . |
| 0231665 | 12/1987 | European Pat. Off. . |
| 3528591 | 10/1988 | Fed. Rep. of Germany . |
| 3142603 | 6/1989 | Fed. Rep. of Germany . |
| 1654690 | 6/1991 | U.S.S.R. .......................... 73/862.08 |
| 0395717 | 7/1933 | United Kingdom . |

*Primary Examiner*—Tom Noland
*Assistant Examiner*—James M. Olsen
*Attorney, Agent, or Firm*—Harness, Dickey & Pierce

[57] ABSTRACT

The invention has an assembly for identifying the direction of power in a driveline in the case of torque transmission. The assembly includes a positively driven first drive element and a second drive element connected to the first to pass on torque. The first and the second drive elements are rotatable relative to each other in a torque-free way, via a limited angle of rotation, but in their respective end positions, relative to each other, they rest against non-rotating stops. Furthermore, the assembly includes a switching pin and a sensor for recording the respective relative position of rotation of the second drive element relative to the first drive element. Also, the assembly includes toothed discs and associated sensors for recording the direction of rotation. The sensors load an evaluating unit which, as a function of the relative positions of rotation of the drive elements and the directions of rotation, generates a signal characterizing the direction of power.

17 Claims, 8 Drawing Sheets

ASSEMBLY FOR IDENTIFYING THE DIRECTION OF POWER IN THE CASE OF TORQUE TRANSMISSION

BACKGROUND OF THE INVENTION

The invention relates to assemblies for identifying the direction of power in a driveline. The assemblies include a positively driven first drive element for torque transmission and a second drive element connected to the first for continuing the transmission of torque.

In the drivelines of machinery or vehicles there frequently exists a problem of negative torque build up. For example, this phenomenon is present in machinery which is to be driven and act against driving torque. For instance, an agricultural implement driven by a tractor may be subject to blockage which must be eliminated. So far, freewheeling units or overload couplings have been used for such a purpose. In the drivelines of four wheel drive tractors or vehicles, such negative torques may occur under overrun conditions. Furthermore, a tractor may be subject to negative driving torques during operation of the four wheel drive on dry roads and when the driveline has been designed so that the axle wheels move ahead or lag behind. Negative power directions are also likely if a tractor is fitted with tire sizes which are not adjusted to one another or if, as a result of different degrees of wear, differences occur in the relation between the size of the front wheel tires and the rear wheel tires. In curves, too, torsion may be generated as a result of different rolling radii.

SUMMARY OF THE INVENTION

It is an object of the invention to provide an assembly which permits the direction of power to be identified in the case of torque transmission.

In accordance with the invention, the first and second drive elements, via a limited angle of rotation, are rotatable relative to each other either in a torque-free way or at a predetermined torque value, but with the two drive elements, in their respective end positions relative to each other, resting against non-rotating stops. Also, the assembly includes a mechanism for recording the respective relative position of rotation of the second drive element relative to the first drive element, a mechanism for recording the direction of rotation and an evaluating unit. The evaluating unit, as a function of the relative position of rotation of the drive elements and the directions of rotation or on the basis of the pulse sequence resulting from the position of rotation and directions of rotation, generates a signal characterizing the direction of power.

An advantage of the invention is that with a predetermined direction of rotation and as a function of the relative positions of rotation of the two drive elements relative to each other, it indicates whether the direction of rotation of the positive transmission of torque corresponds to the actually existing conditions of torque transmission, e.g. that the driving first drive element does in fact load, with torque, the driven second drive element or whether, as a result of the special driving conditions, the second driven drive element tries to overrun the positively driven first drive element which would lead to a negative direction of power. The negative direction of power causes a risk of driveline wind-up or even driveline component failure. With a mechanism for identifying the direction of power and with the generation of a signal characterizing the respective direction of power, it is possible to interfere with the drive by either stopping the drive or by interrupting the drive via the control mechanism.

In a further embodiment of the invention, the evaluating unit generates a first and second type of signal. The first signal indicates that the stop of the second drive element, while pointing backwards in the driving direction of rotation of the first drive element, rests against the stop of the first drive element. In this driving direction of rotation, the first drive element is pointing forwards. The second type of signal indicates that the stop of the second drive element, while pointing forwards in the driving direction of the first drive element, rests against the stop of the first drive element. In this case, the first drive element is pointing backwards in the driving direction of rotation.

The first type of signal indicates that in the positive driving direction, a torque is transmitted to the driven drive element. The second type of signal indicates that the driven drive element applies a negative torque to the driving drive element. The signals generated may be visually and/or acoustically recognizable signals which make the operator aware of the respective operating condition and thus enabling him to intervene via the driveline control mechanism.

However, it is also possible for the signals to act directly as control signals for the driving element or the driven element. For example, the second signal may be used to reduce the transmission of torque, to reduce the speed of the vehicle or to change the distribution of power if used in connection with a driveline with a power distributing mechanism. To put automatic evaluation and utilization of the control signals into effect, it is proposed that the first type of signal should ensure continuous transmission of torque. The second type of signal should cause an interruption in the torque transmission.

Several embodiments are proposed for recording the relative positions of rotation of the two drive elements. According to a first embodiment, a switching pin is provided which is guided in one of the drive elements. The pin projects from the drive element, to a greater or lesser extent, depending on the relative position. Also, the pin cooperates with a sensor which records the position of the switching pin and passes the information on to the evaluating unit. Preferably, the switching pin is guided in a radially extending bore in the second drive element. The pin includes a switching head which, in a first position, engages a correspondingly shaped recess in the first drive element and, in a second position, rests on a supporting face. In the second position, the shank projects from the outer face of the second drive element in the direction of the sensor.

In another embodiment, the mechanism for recording the position of rotation is in the form of a toothed disc non-rotatingly associated with each drive element and each cooperating with a sensor. The pulse sequence resulting from the positions of the toothed discs relative to each other and transmitted by the sensors to the evaluating unit are used by the evaluating unit to determine the position of rotation and the to be generated signal. The respective pulse sequence is characteristic of a position of rotation. However, it may also be characteristic of the direction of power which may be indicated directly in the form of a signal.

In addition to these two toothed discs, a further toothed disc may be non-rotatingly connected to the second drive element and associated with a further sensor. The pulse sequence of the toothed discs connected to the first and second drive elements and of the further toothed disc, which signal is also transmitted by the sensors to the evaluating unit, enables the evaluating unit to identify the direction of rotation. The interrelation between the direction of rotation and the relative position of rotation of the two drive elements enables the evaluating unit to determine whether it is a rotational position, where a positive transmission of torque takes place between the two drive elements, or whether the to be driven drive element applies a negative torque resulting in a negative direction of power. The further toothed disc may be arranged so as to be angularly offset relative to one of the two other toothed discs.

In cases where a switching pin is provided for identifying the position of rotation the invention proposes two toothed discs for identifying the direction of rotation. The discs are associated with one of the two drive elements, non-rotating relative to each other and each cooperate with a sensor.

The first drive element should be provided in the form of a driveshaft received in the bore of a hub which constitute the second drive element. Also, the drive element should be associated with wedges engaging, with rotational play, the grooves of the other drive element.

In a second embodiment the first drive element is formed by one of the plate carriers of a plate friction coupling. The second drive element is formed by at least one associated friction plate. Also, the second drive element carries a toothed disc and the other friction plates are non-rotatingly attached to a hub.

Finally, with respect to the drive element, it is possible for the two drive elements to constitute the two coupling parts of a claw coupling whose claws engage with rotary play.

In case where the toothed discs and sensors are used for identifying the position of rotation of the two drive elements relative to each other, the toothed discs of the two drive elements may include teeth of identical pitch values. However, it is also possible to use toothed discs with different pitch values, in which case the teeth and the gaps between the teeth of a toothed disc may be twice the size of those of the other toothed disc.

To ensure that the second signal is not generated unless a certain negative power value is reached, for the purpose of ensuring contact of the stop of the second drive element positioned at the rear in the driving direction of rotation of the first drive element, the second drive element is pretensioned in the direction of the stop of the first drive element acting in support of the positive torque transmission.

From the following detailed description taken in conjunction with the accompanying drawings and subjoined claims, other objects and advantages of the present invention will become apparent to those skilled in the art.

BRIEF DESCRIPTION OF THE DRAWINGS

Preferred embodiments of the invention are diagrammatically illustrated in the drawing wherein.

DETAILED DESCRIPTION OF THE PREFERRED EMBODIMENTS

Figure 1:
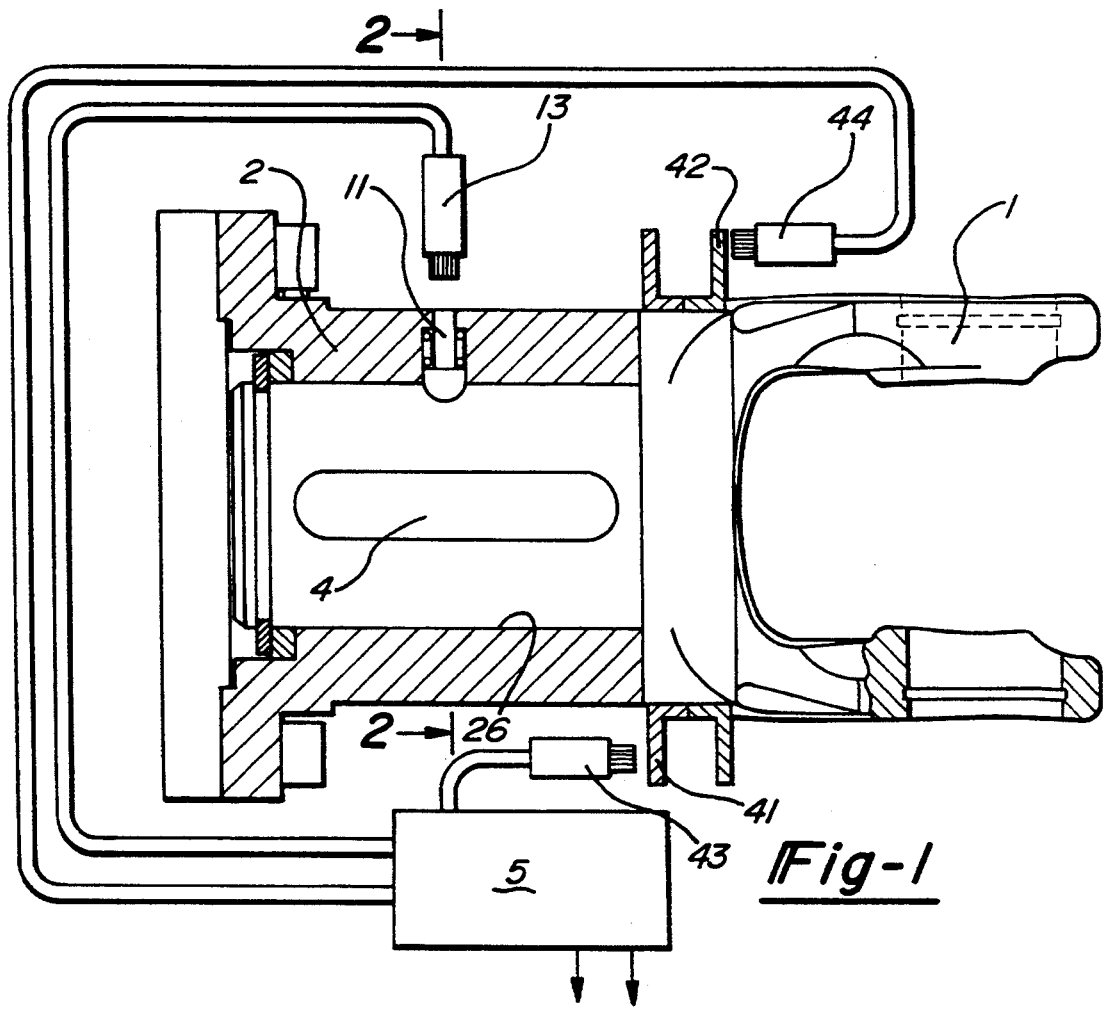
FIG. 1 is a longitudinal section view of a first embodiment of the present invention.
Figure 2:
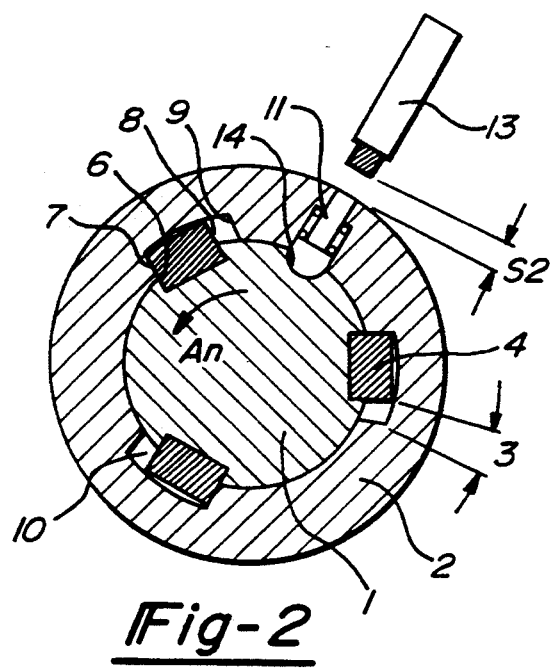
FIG. 2 is a cross-section view of FIG. 1 along line 2—2 thereof with a positive counterclockwise driving direction of rotation.
Figure 3:
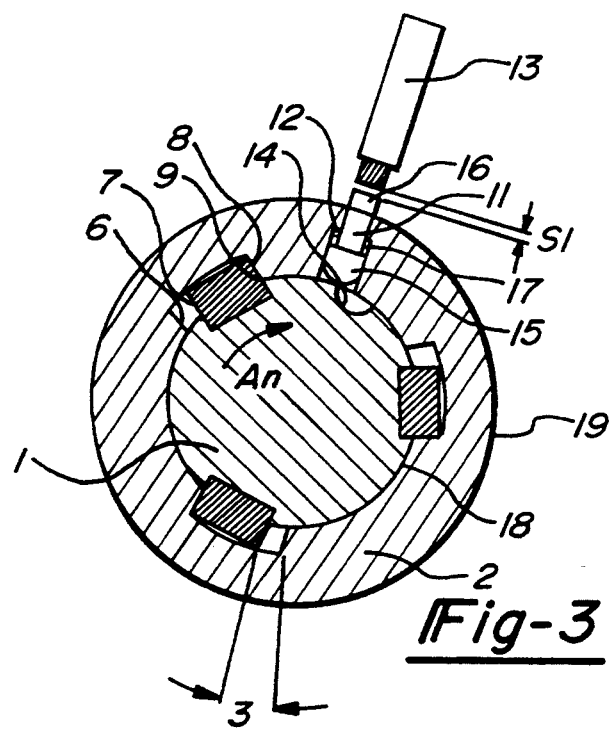
FIG. 3 is a cross-section view of FIG. 1 along line 2—2 thereof with a positive clockwise driving direction of rotation.

FIGS. 1 to 3 illustrate a first embodiment of the assembly for identifying the direction of power. The first drive element is provided in the form of a shaft stub which, for example, could form part of a propeller shaft by forming a joint yoke on to the shaft stub. A recess of the shaft stub non-rotatingly receives circumferentially distributed wedges 4. The wedges 4 engage recesses 10 of the second drive element 2. The second drive element 2 is designed as a sleeve having a flange which may serve to attach the sleeve to a machine or vehicle part to be driven, for example the front axle drive.

In the circumferential direction, the recesses 10 of the second drive element 2 are larger in size than the wedges 4. Thus, in the circumferential direction, there exists rotational play between the wedge 4 and the recess 10. The stop-forming side faces of the wedges 4 have been given the reference numbers 7 and 8, respectively. The associated stop faces of the second drive element 2 formed by the wall of the recess 10 have been given the reference numbers 6 and 9, respectively. The stop 7 of the wedge 4 and the stop 6 of the second drive element 2 cooperate with the stop 8 of the wedge 4 and the stop 9 of the second drive element 2.

To identify the positions of rotation of the two drive elements 1, 2 relative to each other, a switching pin 11 is provided which cooperates with a sensor 13. The switching pin 11 is arranged in a radially extending bore 12 of the second drive element 2. Towards the first drive element 1 the switching pin 11 has a switching head 15 whose contour is adapted to the contour of the recess 14 in the outer face 18 of the first drive element 1. The switching head 15 is followed by a shank 16 which is guided outwardly through the bore 12 and projects from the second drive element 2. Between the switching head 15 and the step of the bore 12, a spring 17 is provided which radially inwardly pushes the switching pin 11. In a first position, where the switching head 15 of the switching pin 11 engages the recess 14, the shank end 16 of the switching pin 11 is substantially flush with the outer face 19 of the second drive element 2 as seen in FIGS. 1 and 2. In the first position, the stop face 7 of the wedge 4 rests against the stop face 6 of the second drive element 2. This position corresponds to drive being effected via the first drive element 1 in a positive counterclockwise driving direction of rotation. The driving direction of rotation is indicated by the arrow with the reference symbol An drawn into the first drive element 1. The sensor which serves to identify the position of the switching pin 11 has been given the reference number 13. It passes the information on the position of the switching pin 11 on to the evaluating unit 5.

FIG. 3 shows the position of the two drive elements 1, 2 relative to each other with the stop 8 of the wedge 4 of the first drive element 1 contacting the stop 9 of the second drive element 2. In this relative position of rotation between the first drive element 1 and the second drive element 2, the switching pin 11, with its switching head 15, has left the recess 14 in the first drive element 1. Against the force of the spring 17, the switching pin 11 is displaced radially outwardly and, with its switching head 15 supported on the outer face 18 of the first drive element 1. The sensor 13 senses the switching pin 11 with its shank 16 projecting beyond the outer face 19 of the second drive element 2 and thus closer to the sensor 13 than in the position as illustrated in FIG. 2.

A positive, clockwise transmission of torque and power by the first drive element 1 is achieved in the relative position as illustrated in FIG. 3. If, with the first drive element 1 being driven positively and counterclockwise as illustrated in FIG. 2, a force is applied to the second drive element 2 restraining it relative to the driving direction of rotation An counterclockwise, because it can not rotate faster than the first drive element 1 the contact conditions of the stops change so that the stops 8 and 9 come into contact relative to each other, as illustrated in FIG. 3. The direction of rotation which is also transmitted to the evaluating unit 5 is determined, for example, from the pulse sequence of toothed discs 41, 42 which are non-rotatingly associated with the first drive element 1 and relative to each other, while making use of the sensors 43, 44.

From the direction of rotation and the position of the switching pin 11, the evaluating unit 5 is able to determine that, with taking into account a positive driving direction of rotation An and positions of the two driving elements 1, 2 relative to each other as illustrated in FIG. 3, there exists a negative direction of power. The evaluating unit 5 generates a signal for the operative which, at the same time, may serve as a control signal, for example for operating a disconnecting coupling. If the driving direction of rotation and the position of the switching pin 11 correspond to the driving directions of rotation as shown in FIGS. 2 and 3, and if corresponding pulse sequences are transmitted by the toothed discs 41, 42 and the respective sensors 43, 44 to the evaluating unit 5, a first signal is generated which indicates that the driving torque is in fact transmitted in the desired direction of power. In this condition, the stops 7 or 8 of the wedge 4 of the first drive element 1 which point forwards in the driving direction of rotation An rest against the stop 6 or 9 of the second drive element 2 which point backwards in the driving direction of rotation An.

The toothed discs 41, 42 are designed as described in connection with FIG. 6.

Figure 4:
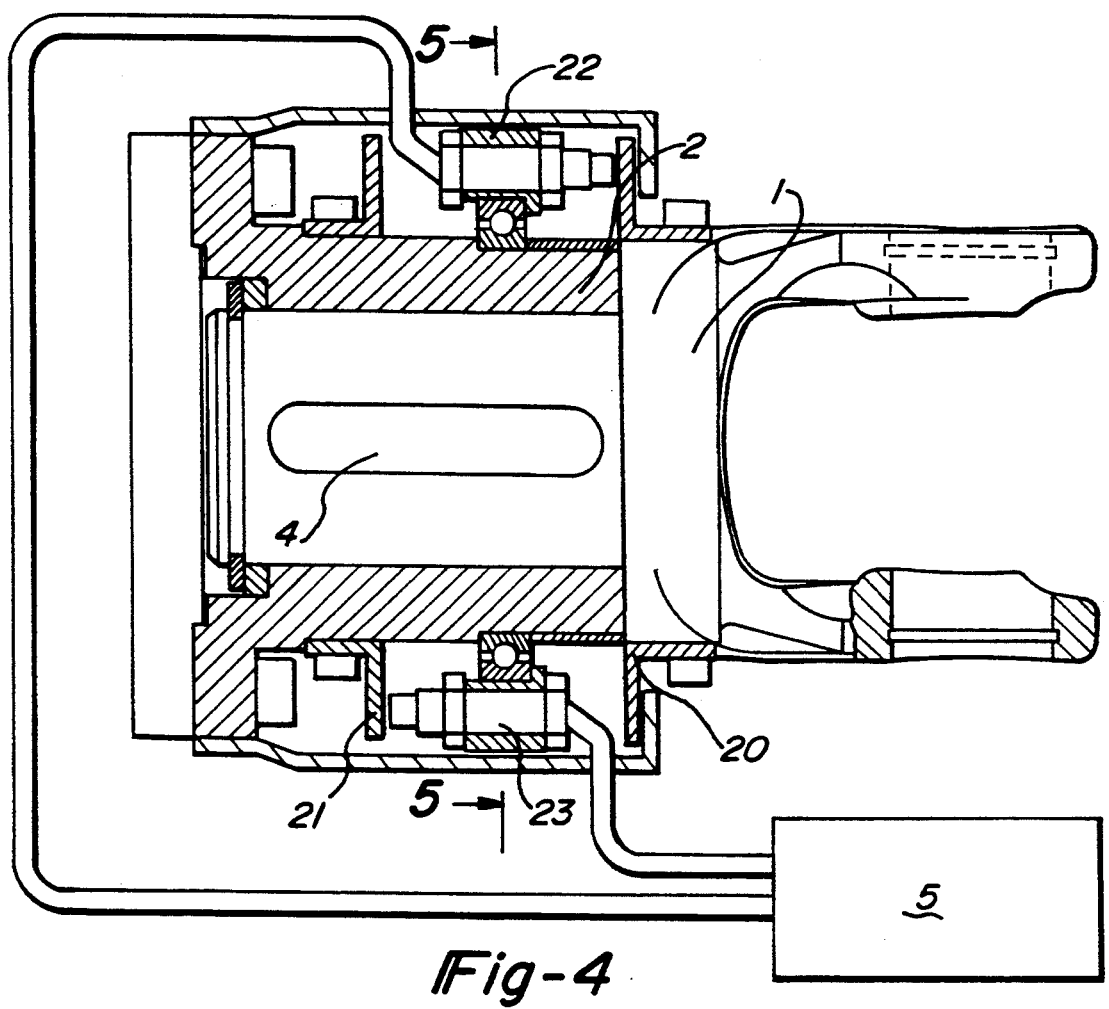
FIG. 4 is a longitudinal section view of a drive elements of another embodiment in accordance with the present invention.
Figure 5:
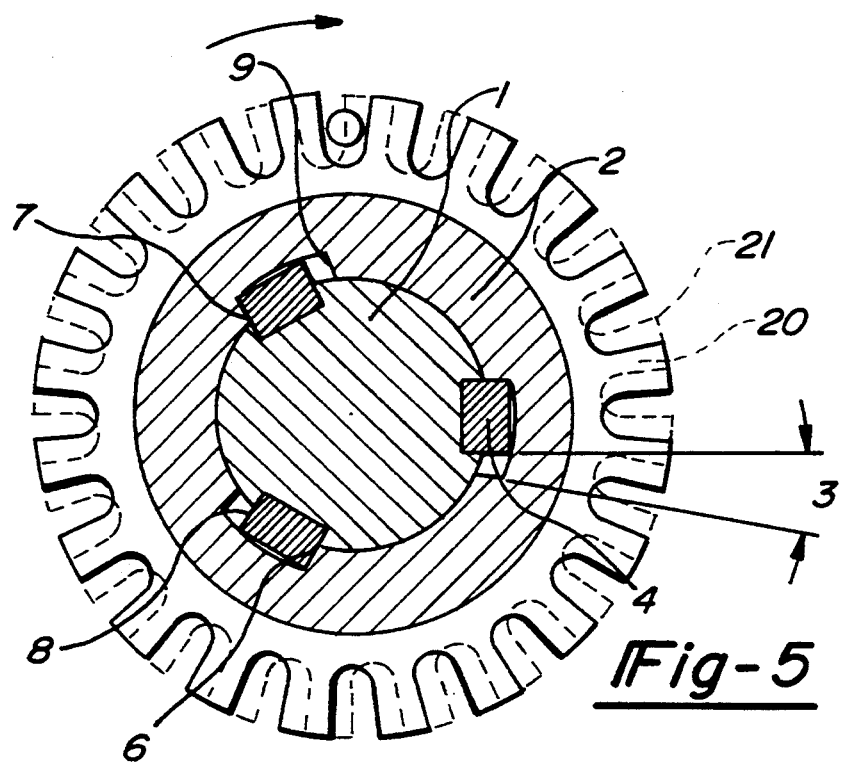
FIG. 5 is a cross-section view of FIG. 4 through line 5—5 with a positive clockwise driving direction of rotation.
Figure 6:
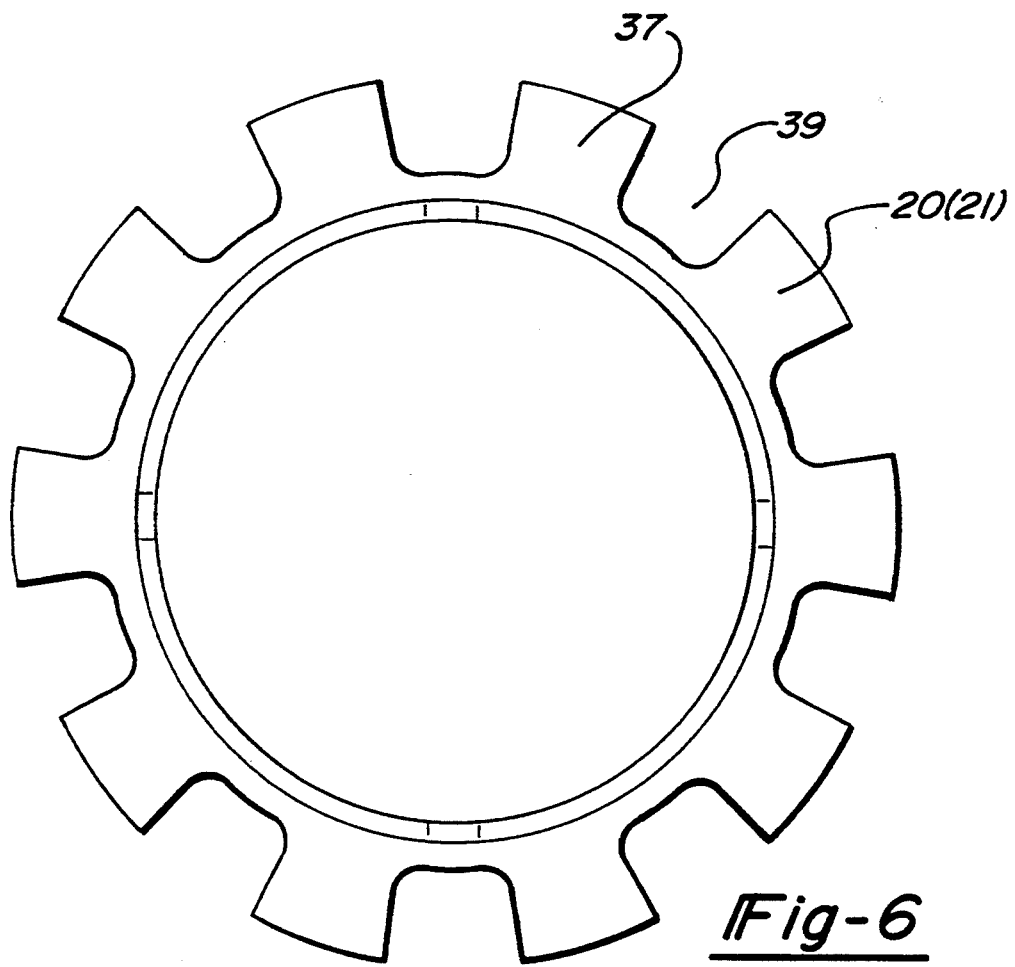
FIG. 6 is a plan view of a toothed disc in accordance with the present invention.

FIGS. 4 to 6 show a second embodiment. The difference between the second embodiment and that shown in FIGS. 1 to 3 is that the two drive elements 1, 2 have each been provided with a toothed disc 20, 21 to enable identification of their relative rotational position. As can be seen in FIG. 6, the toothed discs are designed as angle rings, the outwardly pointing leg having teeth 37 which alternate with gaps 39. Two embodiments are conceivable which will be explained in greater detail in connection with FIGS. 11 and 12.

Each toothed disc 20, 21 is associated with a sensor 22, 23. The sensor 22 cooperates with the toothed disc 20 and the sensor 23 with the toothed disc 21. Relative to each other and relative to at least one of the toothed discs 20 or 21, the two sensors 21, 23 are stationarily held. FIG. 5 illustrates the first of the two possible relative positions. In the driving direction of rotation An of the driven first drive element 1, the stop 7 of the first drive element 1, which points backwards relative to the driving direction of rotation An, rests against the stop 6 of the second drive element 2, which points forwards in the driving direction of rotation An. This means that the second drive element 2, which should actually be driven by the drive element 1, applies a driving force to the drive element 1. Thus, there exists a negative direction of power. The positions of the two toothed discs 20, 21 relative to each other, in cooperation with the respective sensors 22, 23, generate a sequence of signals. The sequential signals are characteristic of the position of rotation of the two drive elements 1, 2 relative to each other. Thus, while taking into account the driving direction of rotation An, which is also transmitted to the evaluating unit 5 in the form of a value, the evaluation unit permits a conclusion regarding a negative direction of power and in the evaluating unit 5, leads to a second type of signal.

FIG. 6 shows a toothed disc 20, 21. The toothed discs 20, 21 as illustrated in FIG. 5 correspond to the toothed disc shown in FIG. 6. This means that for the embodiment of FIGS. 4 and 5 the two toothed discs 20, 21 are identical. The toothed disc includes teeth 37 and gaps 39 between the teeth which have identical pitch values and extend circumferentially in identical ways.

Figure 7:
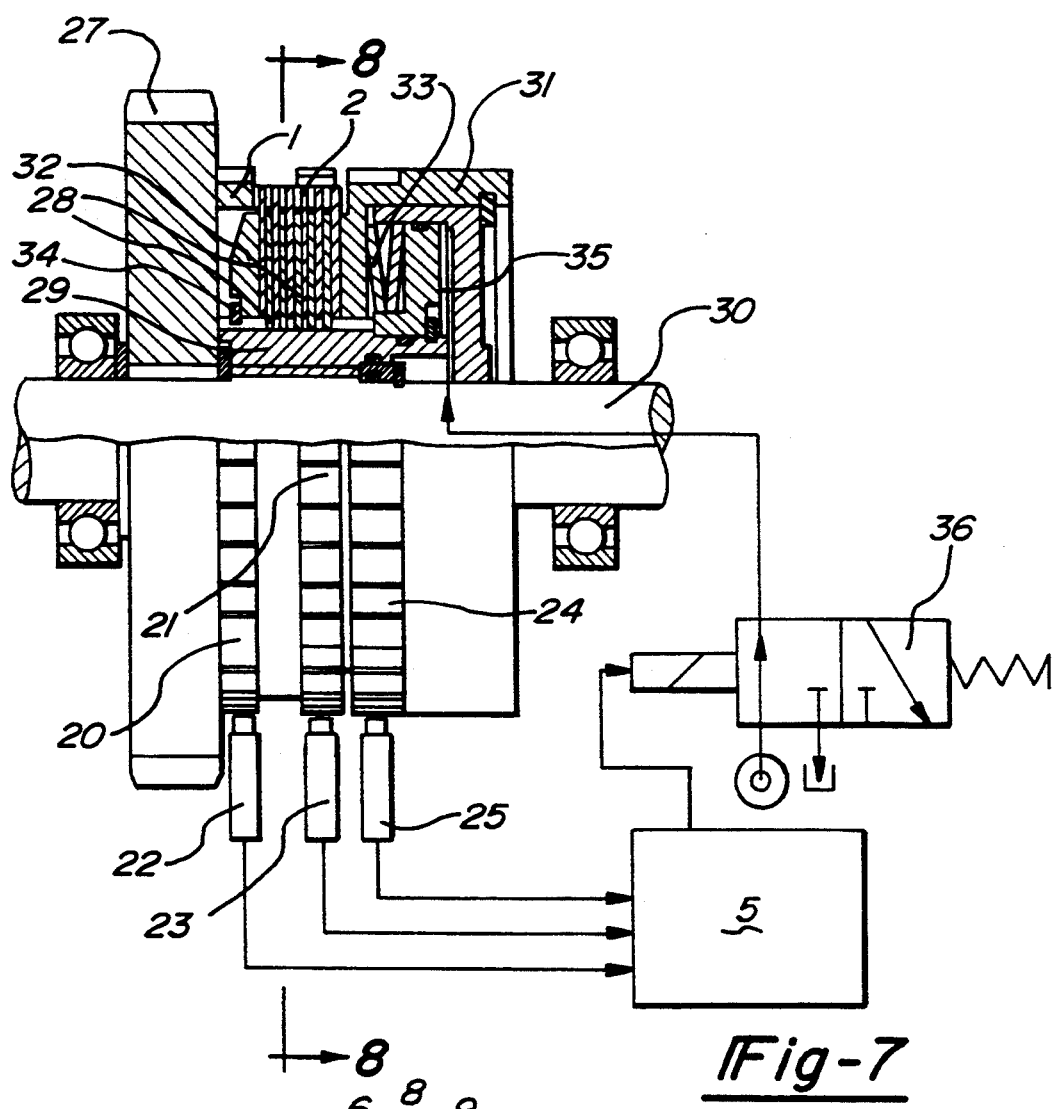
FIG. 7 is a longitudinal view partially in section of another embodiment in accordance with the present invention.
Figure 8:
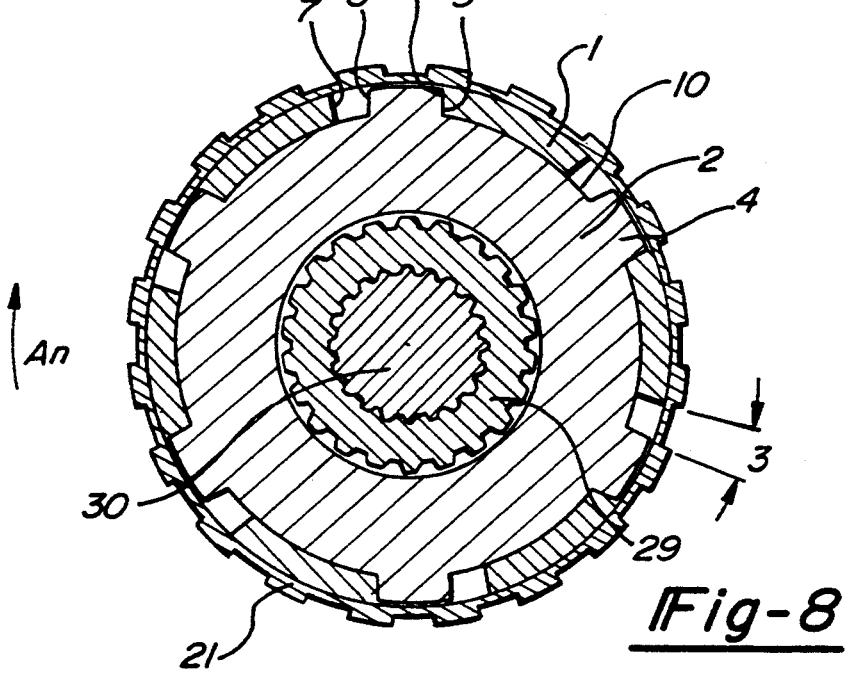
FIG. 8 is a cross-section view of FIG. 7 along line 8—8 thereof.

FIGS. 7 and 8 illustrate a friction coupling with an assembly for identifying the direction of power. In addition, the friction coupling is designed to be switchable. The introduction of torque into the first drive element 1, designed as a plate carrier, is effected via the non-rotatingly connected gearwheel 27. Following the driving gear 27, the outer contour of the drive element 1, is designed to form the first toothed disc 20. The toothed disc 20 cooperates with a sensor 22. The plate carrier, constituting the first drive element 1, is provided with friction plates. Some of the friction plates are non-rotatingly held in the first drive element 1. Thus, the plates, together with the plate carrier, form the first drive element 1. At least one of the friction plates associated with the plate carrier is arranged with rotational play relative to the remaining friction plates. The rotational plate constitutes the second drive element 2.

Outwardly pointing wedge-shaped projections 4 of the drive element 2 engage, with rotational play 3, the corresponding recesses 10 in the first drive element 1. When the first drive element 1 is driven counterclockwise, the stop face 8 of the first drive element 1, as in FIG. 8, rests against the stop face 9 of the second drive element 2 in the form of the circumferentially adjustable friction plate. This friction plate is attached to a toothed disc 21 which rotates relative to the toothed disc 20 attached to the plate carrier or drive element 1.

The friction plates associated with the first drive element 1 are in friction contact with further friction plates 28 non-rotatingly arranged on a hub 29. The further friction plates 28 alternate with the first friction plates of the first drive element 1. The plate package is axially supported on the abutment 32 of the hub 29. The pressure plate 31 pressurized by a pressure spring 33 is supported on the other end of the plate package. The abutment 32 is axially secured to the hub 29 via the securing plate 34. Between the pressure plate and the support for the pressure spring 33 a cylindrical space 35 is formed which, via a valve 36, is supplied with a pressure agent to relieve the load on the friction assembly and thus interrupt the torque flow. The valve 36 is controlled via the evaluating unit 5. The pressure plate 31 is non-rotatingly secured to the hub 29.

The plate 31, on its outer face, includes teeth 24 which are associated with a further sensor 25. The sensors 22 and 25, together with the toothed discs 21, 24 identify the direction of rotation. With the help of the pulse sequence determined by the sensors 22, 23 in connection with the toothed discs 20, 21 associated with the two drive elements 1, 2 and with the help of the direction of rotation, the evaluating unit 5 generates signals to control the valve 36. For the driving direction of rotation of the drive element 1 in the direction of the arrow An according to FIG. 8 and for the relative position of rotation illustrated therein in the case of which the stop 7 of the first drive element 1 positioned in front in the direction of rotation rests against the stop 6 of the second drive element 2 pointing backwards in the direction of rotation, a signal is generated for pressurizing the cylindrical space 35 with a pressure agent from the pressure agent reservoir by the pump so that the pressure plate 31 is lifted off the friction plate assembly. The power flow is interrupted. It is a signal which recognizes that with the existing clockwise driving direction of rotation of the first drive element 1 no positive torque is transmitted to the drive element 2, but that the latter has a driving effect on the drive element 1 so that a negative direction of power occurs with the control sequence being as described above.

The pulse sequence resulting from the way in which the two toothed discs 20, 21 are associated and from the changes in their relative positions will be explained in greater detail in connection with FIGS. 11 and 12.

Figure 9:
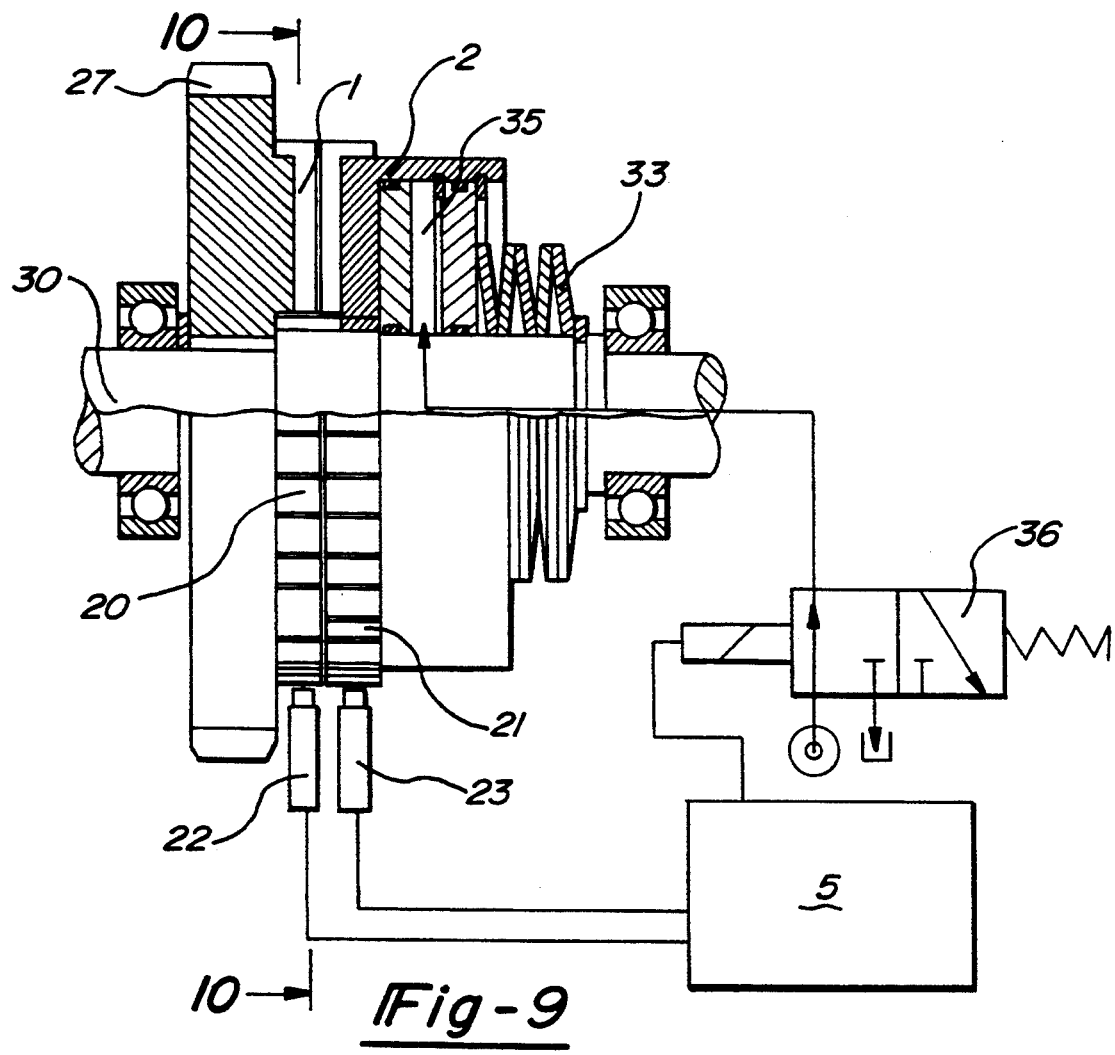
FIG. 9 is a longitudinal section view partially in section of another embodiment in accordance with the present invention.
Figure 10:
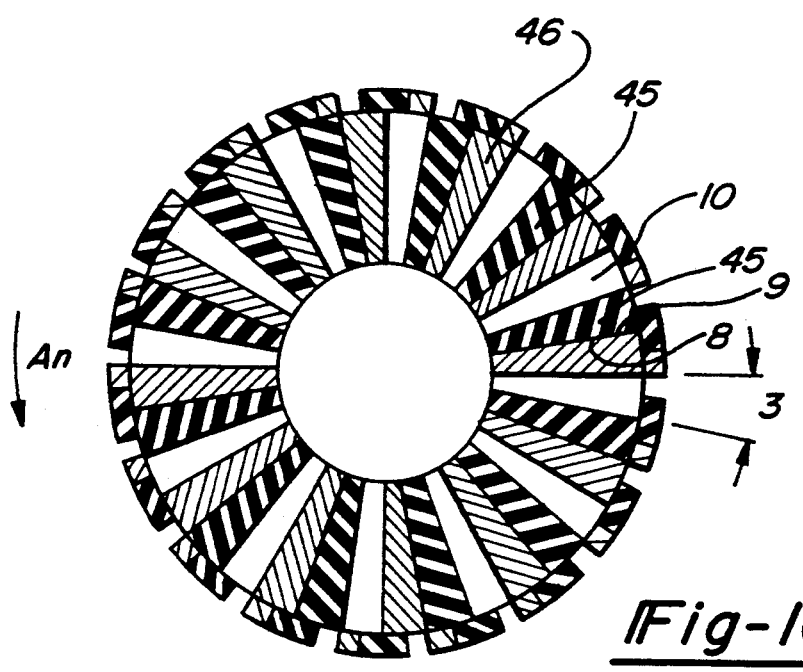
FIG. 10 is a section view of FIG. 9 along line 10—10 thereof.

Instead of a friction assembly, FIGS. 9 and 10 show a claw coupling. The one coupling half, which is integral with the driving gear 27, constitutes the first drive element 1. As shown in FIG. 10, it comprises claws 45. These claws 45 axially engage corresponding recesses 10 in the second drive element 2 which is the second coupling half of a claw coupling. The claws 46 are provided between two circumferentially following recesses 10 of the second drive element. As compared to the recesses 10 of the second drive element 2, the circumferential extension of the claws 45 of the first drive element 1 is reduced by the amount of the rotational play 3.

FIG. 9 shows the position for the switching valve 36 according to which a pump is connected to the cylindrical space 35 via the switching valve 36, in this condition, the pressure plate is displaced towards the right against the force of the spring 33. In the process, the claws 45, 46 become disengaged. This is the reason why FIG. 10 shows the relative positions of rotation of the two drive elements 1, 2 in which a second type of signal is generated which leads to the power flow being interrupted due to a prevailing negative direction of power. In this position, with the predetermined counterclockwise driving direction of rotation, the stop 8 of the claw 45 of the drive element 1 rests against the stop 9 of the claw 46 of the drive element 2.

Figure 11:
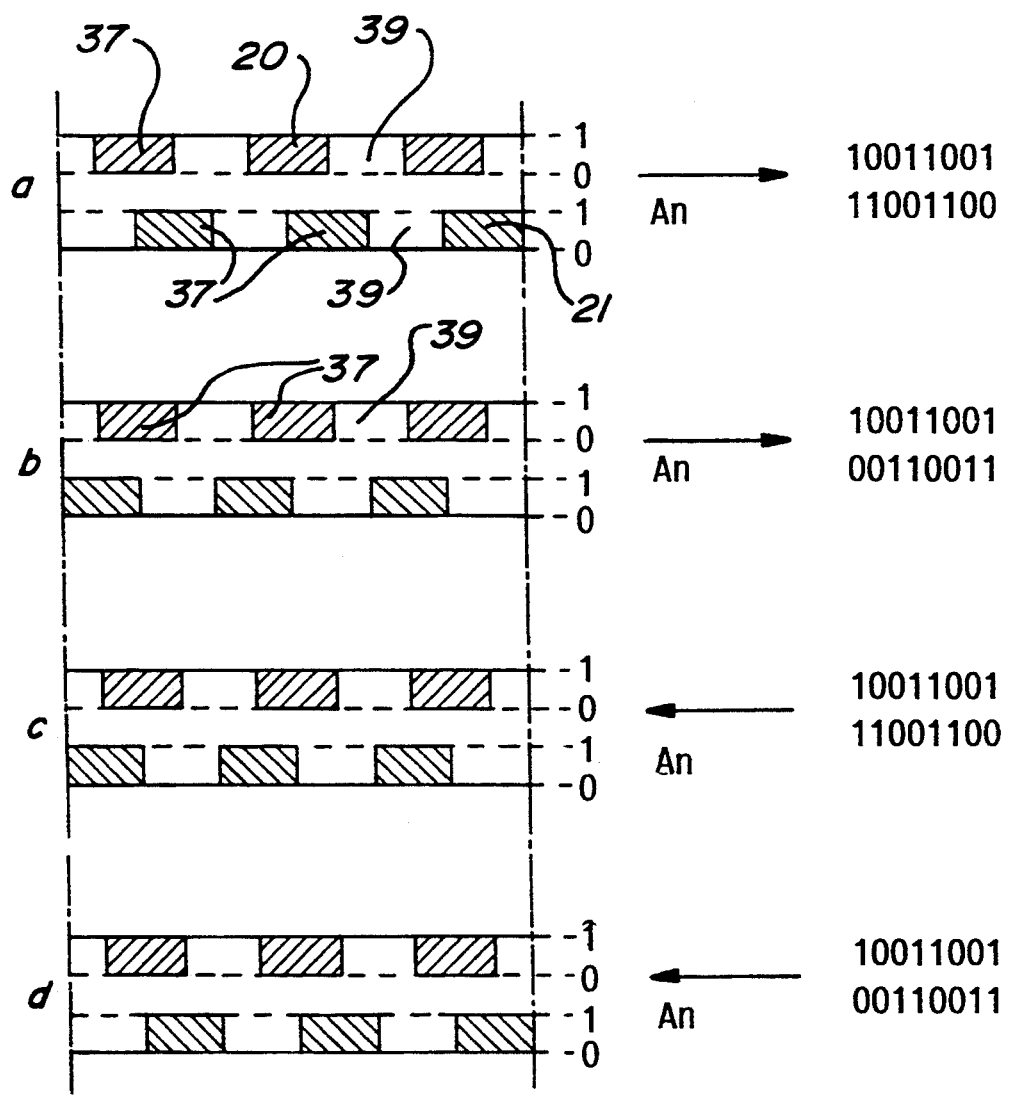
FIGS. 11a through 11d show the way in which the toothed discs are associated with each other in different positions in respect of the clockwise and counterclockwise driving direction of rotation, and the resulting pulse sequence, with the toothed discs having teeth of identical pitch values.

FIG. 11 shows the toothed discs 20, 21 whose teeth 37 have identical pitch values. The circumferential extensions of the teeth 37 and of the gaps 39 between the teeth are of identical size. For the sake of simplicity, the drawing shows a developed view of part of the circumference of the two toothed discs 20, 21. FIG. 11a shows the position of two toothed discs 20, 21 for the purpose of assuming a relative position where power is positively transmitted from the first drive element 1 to the second drive element 2. With reference to the embodiment of the assembly according to FIGS. 7 and 8, for example, this would mean that the coupling remains closed. Thus, the valve would connect the cylindrical space 35 to the return flow and the reservoir. The pulse sequence which, for this purpose, is transmitted by the sensors to the evaluating unit 5 is illustrated to the right of the two partially illustrated toothed discs 20, 21. Accordingly, for the same driving direction of rotation, FIG. 11b shows the positions of the teeth 37, 38 and the gaps 39, 40 between the teeth of the two toothed discs 20, 21 relative to each other for the condition of a negative direction of power.

For the two corresponding conditions, with an opposed driving direction of rotation of the first drive element, pulse sequences are generated as illustrated in FIGS. 11c and 11d. Thus, whenever a negative direction of power prevails, the command to open the coupling is given, as shown in FIGS. 7 and 8 for example. This condition corresponds to the switching condition of the valve 36 in FIG. 7.

Figure 12:
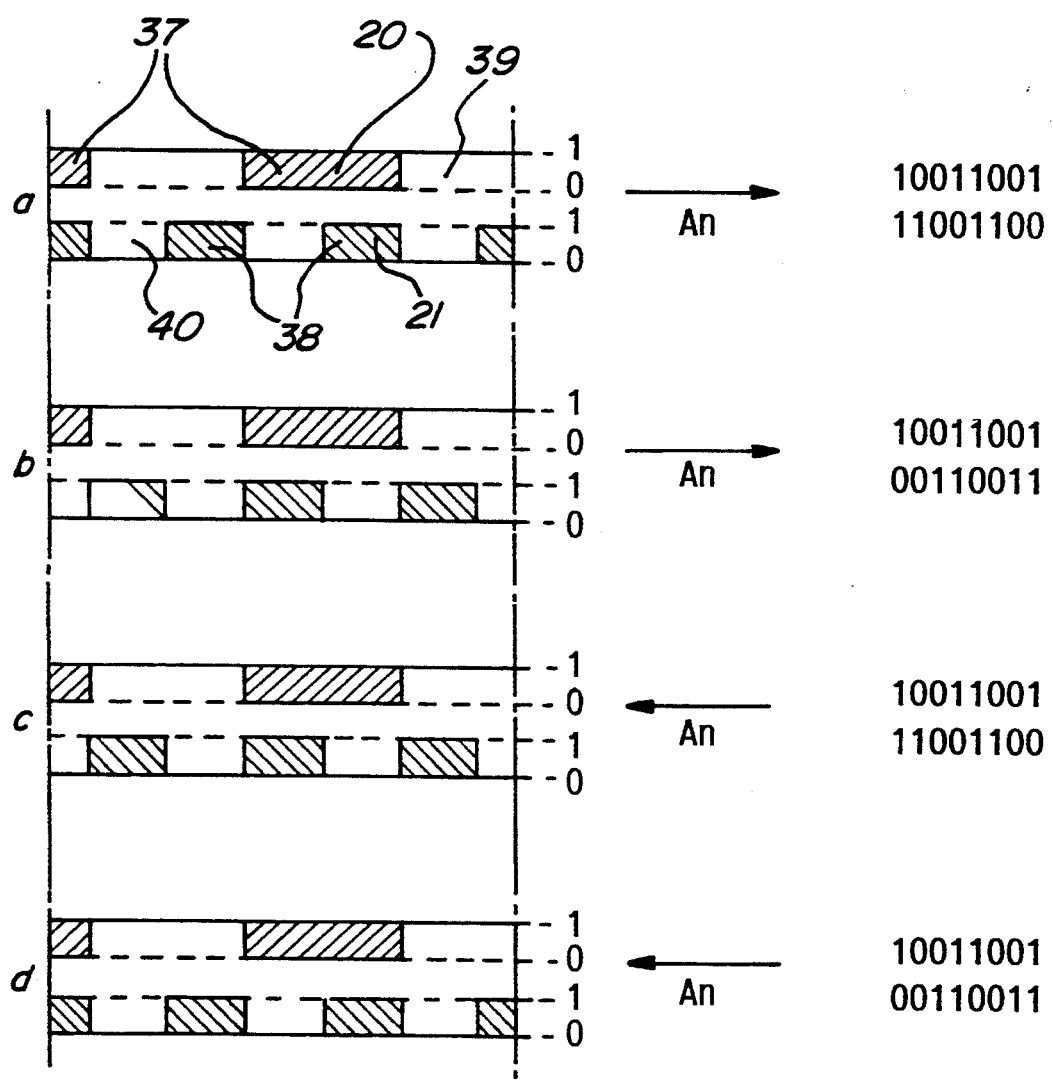
FIGS. 12a through 12d are a modification of the design according to FIG. 11 where the pitch values of the teeth and gaps between the teeth of one of the toothed discs differ from those of the other toothed disc.

FIG. 12 shows the two toothed discs 20 and 21 in the respective positions as shown in FIGS. 11a to 11d, with the tooth pitch values of the two toothed discs 20, 21 differing. Thus, the toothed disc 20, relative to the toothed disc 21, comprises teeth 37 and gaps 39 between the teeth which, with respect of their circumferential extension, are double the size of the teeth 38 and the gaps 40 between the teeth of the toothed disc 21.

Figure 13:
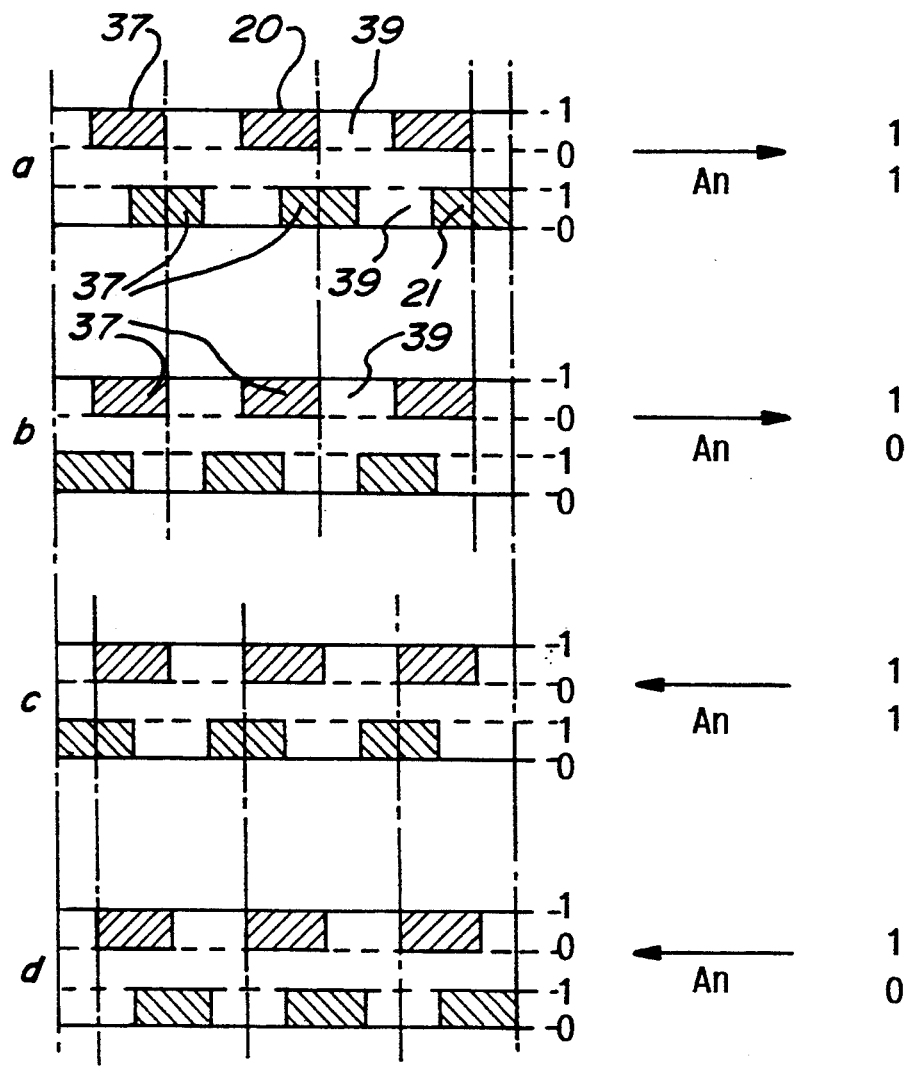
FIGS. 13a through 13d are like FIG. 11 of another embodiment of the invention.

FIG. 13 shows the toothed discs 20, 21 designed as illustrated in FIG. 11, and whenever the sensor, with respect of the toothed disc 20, identifies the value 1, the value is compared with the pulse of the toothed disc 21. The resulting pulse sequence characterizes the existing direction of power.

We claim:

1. An assembly for identifying the direction of power in a driveline in the case of torque transmission comprising:
   a positively driven first drive element;
   a second drive element connected to said first element for passing on torque, said first and second drive elements, via a limited angle of rotation, being rotatable relative to each other in a torque-free way or at a predetermined torque value, said first and second elements in respective end positions relative to each other resting against non-rotating stops;

means for recording the respective relative position of rotation of the second drive element relative to the first drive element;

means for recording the direction of rotation of said first and second elements, and an evaluating unit for generating a signal characterizing the direction of power, said evaluation unit generating said signal as a function of the relative positions of rotation of the drive elements and the directions of rotation.

2. An assembly according to claim 1, wherein the evaluating unit generates a first type of signal when a first stop of the second drive element rests against a first stop of the first drive element with said first drive element rotating in a first driving direction of rotation, and said evaluating unit generates a second type of signal when a second stop of the second drive element rests against a second stop of the first drive element, with said first drive element rotating in a driving direction of rotation.

3. An assembly according to claim 2, wherein the signal generated by the evaluation unit is a control signal for at least one of the driven or driving element.

4. An assembly according to claim 3, wherein the first type of signal ensures the continued transmission of torque and the second type of signal causes an interruption in the transmission of torque.

5. An assembly according to claim 2, wherein, for the purpose of ensuring contact of the stop of the second drive element positioned at the rear in the driving direction of rotation of the first drive element, the second drive element is pretensioned in the direction of the stop of the first drive element acting in support of the positive transmission of torque.

6. An assembly according to claim 1, wherein the signals are at least visually or acoustically recognizable signals.

7. An assembly according to claim 1, wherein said means for recording the relative position of rotation of the two drive elements relative to each other include a switching pin guided in one of the drive elements and project therefrom to a greater or lesser extent depending on its relative position and a sensor cooperating with the switching pin.

8. An assembly according to claim 7, wherein the switching pin is guided in a radially extending bore of the second drive element and includes a switching head which, in a first position, engages a correspondingly formed recess of the first drive element and, in a second position, rests on a supporting face and, in this position, its shank projects from the outer face of the second drive element in the direction of the sensor.

9. An assembly according to claim 7, wherein two toothed discs are non-rotatingly attached relative to each other to one of the two drive elements for recording the direction of rotation and each disc associated with a sensor.

10. An assembly according to claim 1, wherein the means for recording the relative position of rotation of the two drive elements includes a toothed disc associated and non-rotatingly connected with each drive element and a sensor associated with each toothed disc, each of the sensors providing a pulse sequence, and the evaluating unit determines the position of rotation or directly the direction of power directly in accordance with the pulse sequences.

11. An assembly according to claim 10, wherein a further toothed disc is non-rotatingly connected to the second drive element and associated with a further sensor, and from the pulse sequence of the toothed disc connected to the first or second drive element and from a pulse sequence associated with the further toothed disc and from the associated sensors, the evaluating unit determines the direction of rotation.

12. An assembly according to claim 11, wherein the further toothed disc is arranged so as to be angularly offset relative to one of the two other toothed discs.

13. An assembly according to claim 10, wherein the toothed discs of the two drive elements include teeth with identical pitch values.

14. An assembly according to claim 10, wherein the toothed discs of the two drive elements include teeth of different pitch values, the teeth and the gaps between the teeth of one of the toothed discs being twice the size of the teeth and gap of the other toothed disc.

15. An assembly according to claim 1, wherein the first drive element is formed by a driveshaft received in a bore of a hub constituting the second drive element and that one drive element is associated with wedges engaging, with rotational play, grooves of the other drive element.

16. An assembly according to claim 1, wherein the first drive element is formed by a plate carrier of a plate friction coupling and the second drive element by at least one friction plate associated therewith and carrying a toothed disc and that the other friction plates are non-rotatingly attached to a hub.

17. An assembly according to claim 1, wherein the two drive elements are two coupling parts of a claw coupling whose claws engage with rotary play.

* * * * *